A. H. B. ROBERTS.
DRY VAPOR GENERATOR.
APPLICATION FILED FEB. 11, 1918.
1,282,372. Patented Oct. 22, 1918.
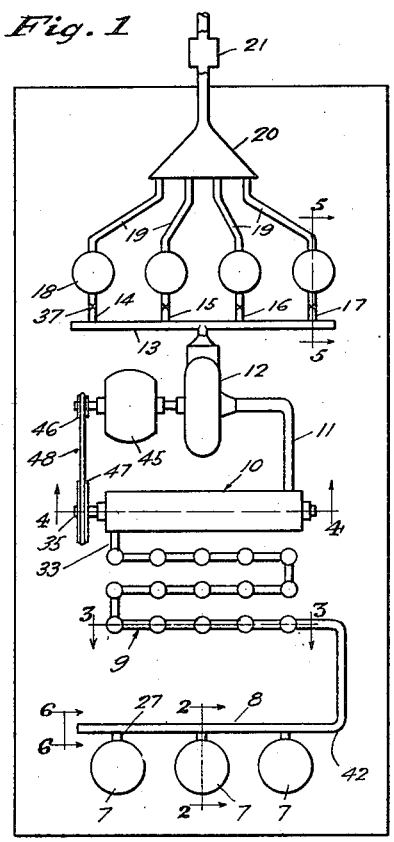
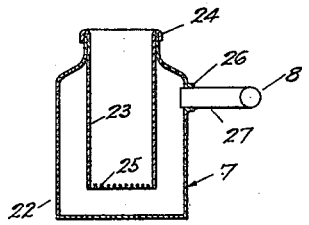
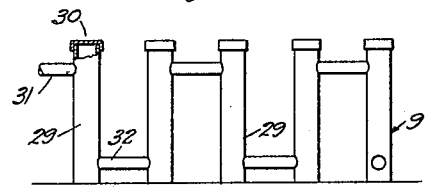
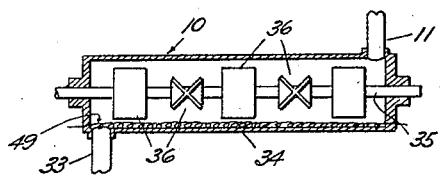
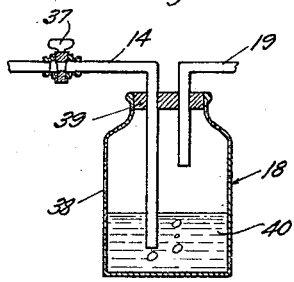
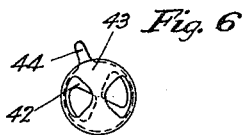
Inventor
Alfred H. B. Roberts
by Westall and Wallace
his Attorneys

UNITED STATES PATENT OFFICE.

ALFRED H. B-ROBERTS, OF LOS ANGELES, CALIFORNIA.

DRY-VAPOR GENERATOR.

1,282,372. Specification of Letters Patent. Patented Oct. 22, 1918.

Application filed February 11, 1918. Serial No. 216,573.

*To all whom it may concern:*

Be it known that I, ALFRED H. B-ROBERTS, a citizen of the United States, residing at Los Angeles, in the county of Los Angeles and State of California, have invented new and useful Improvements in Dry-Vapor Generators, of which the following is a specification.

This invention relates to an apparatus for producing and treating a vapor such as can be inhaled by a person, and especially a vapor having curative qualities.

It is an object of this invention to provide an apparatus in which a vapor is generated and through which it is passed, so that during its passage the vapor is treated to introduce certain medicaments and to extract others, some of which are in suspension, and whereby a dry medicated vapor is produced, which in its nascent state has certain curative properties.

This invention is designed as an improvement upon the apparatus disclosed in the patent for vapor or gas generating apparatus, granted to Walter Nathaniel Norwood, March 7, 1911, No. 986,202; and broadly consists in a more compact, simple and inexpensive structure, and one which is more easily operated.

An embodiment of my invention is illustrated in the accompanying drawing in which:

Figure 1 is a plan view with parts shown diagrammatically of the complete apparatus. Fig. 2 is an enlarged vertical section of a furnace element as seen on the line 2—2 of Fig. 1. Fig. 3 is an enlarged section as seen on the line 3—3 of Fig. 1, of one group of purifier elements. Fig. 4 is an enlarged section partly in elevation of the beater as seen on the line 4—4 of Fig. 1. Fig. 5 is an enlarged vertical section of a medicator as seen on the line 5—5 of Fig. 1. Fig. 6 is a side view of the air control.

Referring more particularly to Fig. 1, three furnaces, each indicated by 7 are connected to a manifold 8. The manifold 8 communicates with a series of purifiers, one group of which is indicated by 9. There are three groups of purifiers in series and communicating with one another, so that the vapor will pass through the elements of the groups in series. The last group of the series is connected with the heater 10, and an exit tube 11 is connected to the inlet of a blower 12. The exhaust of the blower is connected to a manifold 13, from which lead inlet tubes 14, 15, 16, and 17, each of which is valve controlled as conventionally indicated in Fig. 1. Each of the inlet tubes is connected to a medicator, one of which is indicated by 18. The tubes 19 from each of the medicators are connected to a chamber 20. A tube connects the chamber 20 with a medicator 21, from which the vapor is led to the place where it is to be used.

Referring more particularly to Fig. 2, the furnaces 7 each comprise a flask 22. Extending through the mouth of and into the flask 22 is a bowl 23. The bowl 23 is open at the upper end and provided with a lip 24 which engages the neck of the flask. The bottom of the bowl 23 is perforated as indicated by 25. An opening 26 is provided in the side of the flask in which the tube 27 connecting furnace 7 and the manifold 8 is placed. The flask and bowl are preferably made of a material which will not give off deleterious fumes or vapors.

The purifier 9, as shown in Fig. 3, comprises a series of barrels 29 open at the top and provided with caps 30. Each barrel has a tube communicating therewith near the top, one of the tubes being indicated by 31, and a tube communicating with the bottom, one of which is indicated by 32. This provides for the passage of the vapor through the barrel. The barrels are connected alternately at the top and bottom, so that the vapor traverses the barrels in series. The last barrel in the series is connected by a tube 33 to the cylinder 34 of the beater, which is more particularly shown in Fig. 4.

The cylinder 34 is closed at its ends by heads, which are provided with bearings in which a shaft 35 is journaled. The shaft 35 has a number of blades fixed thereon which beat the vapor as it enters the cylinder and moves it from the inlet end toward the outlet end and through the discharge tube 11.

Vapor is conducted by the discharge tube 11 to the blower 12 which is of the ordinary type and serves to create a movement of the vapor through the apparatus. The vapor is discharged from the blower into the manifold 13.

From the manifold the vapor passes through any or all of the inlet tubes 14, 15, 16 and 17 which may be open. In Fig. 5 one of the medicators is shown with a valve 37 in the inlet tube 14. The medicator consists of a flask 38 provided with a stopper 39, through which extends the tube 14, the lower end thereof being submerged in a liquid 40, through which the gas bubbles. The exit tube 19 extends through the stopper and to a point above the liquid.

The vapor is discharged by the tube 19 into chamber 20, and then into the cylinder 21, which may be filled with a medicament, after which it is discharged into the place where it is to be used.

In order to adjust the amount of air which may be mixed with the vapor, the end of manifold 8 is open and a spider damper is affixed thereto as indicated by 42. The damper is particularly shown in Fig. 6 and consists of a grid having openings and upon which is mounted a revoluble disk 43, which has openings to register with the openings in grid 42. For convenient manipulation of the disk 43 a handle 44 is formed thereon.

The fan blower impeller is operated by a motor 45 which is direct connected thereto. The shaft of the motor 45 is extended and a pulley 46 mounted thereon. The shaft 35 of the beater is extended and has fixed thereto a pulley 47. Pulleys 46 and 47 are secured together by a belt 48, so that the motor 45 operates both the fan blower and the beater.

The furnace bowls 23 are filled with materials comprising vegetable matter which will burn and give off the desired vapor. The purifier barrels are then filled with material through which the fumes or vapors filter. This material selected is preferably of a character which will absorb moisture and volatile gases. The vapor reaches the beater 10, the blades of the beater throwing the vapor centrifugally toward the cylinder, so that particles in suspension will lodge upon the wall and be separated. At the same time the vapor may be heated by operating the electric heating element 49 disposed in the cylinder 34. From the beater the vapor passes through the fan blower and into the manifold 13. From the manifold 13, the vapor is passed through the liquid contained in medicator 18. The liquid used in medicator 18 is preferably of an oily nature, which in addition to purifying the vapor adds a small amount of the oil thereto. The vapor then passes through the exit tube 19 into the compartment 20. Passage of the vapor through the medicator 21 is not essential. But it is sometimes desirable to add certain medicaments to the vapor. The medicator 21 comprises a barrel, which is preferably filled with a gage which has been medicated.

It will be noted that vapor from burning matter is dried, cooled, undesirable matter separated therefrom then medicated and in its nascent state discharged for use. The structure can be contained within a cabinet, upon a table or arranged in any other convenient manner.

What I claim is:

1. In a vapor producing apparatus, the combination of a furnace for producing vapor by combustion, a drying purifier in communication therewith and through which the vapor passes, a beater comprising a cylinder and rotatable blades therein, said beater being in communication with said purifier, a medicator in communication with said beater and means for creating a flow of vapor through said apparatus.

2. In a vapor producing apparatus, the combination of a furnace having a removable bowl to receive combustible materials for creating a vapor, a drying purifier in communication therewith and through which the vapor passes, a beater comprising a cylinder and rotatable blades therein, said beater being in communication with said purifier, a medicator in communication with said beater, and means for creating flow of vapor through said apparatus.

3. In a vapor producing apparatus, the combination of a furnace for producing vapor by combustion, a drying purifier in communication therewith and through which the vapor passes, a beater comprising a cylinder and blades rotatable in a plane transverse to the axis of said cylinder, said beater being in communication with said purifier, a medicator in communication with said beater, and means for creating a flow of vapor through said apparatus.

4. In a vapor producing apparatus, the combination of a furnace having a removable bowl to receive combustible material for creating vapor, a drying purifier in communication therewith and through which the vapor passes, a beater comprising a cylinder and blades rotatable in a plane transverse to the axis of said cylinder, said beater being in communication with said purifier, a medicator in communication with said beater, and means for creating a flow of vapor through said apparatus.

In witness that I claim the foregoing, I have hereunto subscribed my name, this 24th day of January, 1918.

ALFRED H. B-ROBERTS.